July 12, 1966  W. H. KING, JR  3,260,104
APPARATUS FOR FLUID ANALYSIS
Filed Oct. 24, 1962  7 Sheets-Sheet 1

William H. King, Jr.  INVENTOR

BY David A. Roth

PATENT ATTORNEY

July 12, 1966   W. H. KING, JR   3,260,104
APPARATUS FOR FLUID ANALYSIS
Filed Oct. 24, 1962   7 Sheets-Sheet 2

William H. King, Jr.   INVENTOR

BY  David A. Roth

PATENT ATTORNEY

July 12, 1966   W. H. KING, JR   3,260,104
APPARATUS FOR FLUID ANALYSIS
Filed Oct. 24, 1962   7 Sheets-Sheet 3

William H. King, Jr. INVENTOR

BY David A. Roth

PATENT ATTORNEY

July 12, 1966  W. H. KING, JR  3,260,104
APPARATUS FOR FLUID ANALYSIS
Filed Oct. 24, 1962  7 Sheets-Sheet 4

William H. King, Jr. INVENTOR

BY David A. Roth

PATENT ATTORNEY

July 12, 1966  W. H. KING, JR  3,260,104
APPARATUS FOR FLUID ANALYSIS
Filed Oct. 24, 1962  7 Sheets-Sheet 5

William H. King, Jr. INVENTOR
BY David A. Roth
PATENT ATTORNEY

July 12, 1966   W. H. KING, JR   3,260,104
APPARATUS FOR FLUID ANALYSIS
Filed Oct. 24, 1962   7 Sheets-Sheet 6

WATER CALIBRATION OF SORPTION DETECTOR $\Delta F_0$ = 24.8 KC.
SUBSTRATE - WATER SOLUABLE SULFONATED POLYSTYRENE
TEMPERATURE - 118°F.
ZERO COEFFICIENT - 4.9 CPS/°F.

William H. King, Jr.   INVENTOR
BY
PATENT ATTORNEY

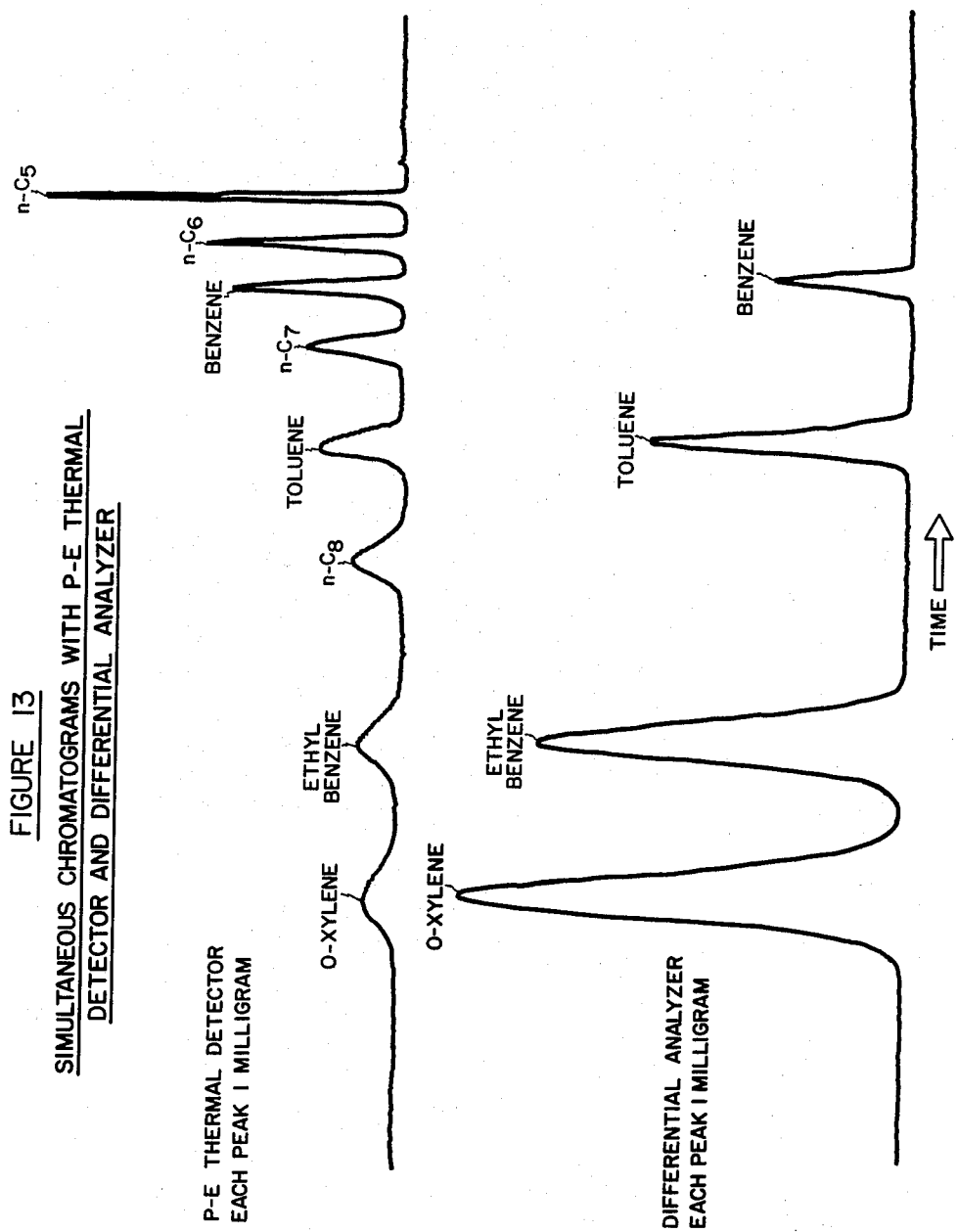

United States Patent Office 3,260,104
Patented July 12, 1966

3,260,104
APPARATUS FOR FLUID ANALYSIS
William H. King, Jr., Florham Park, N.J., assignor to Esso Research and Engineering Company, a corporation of Delaware
Filed Oct. 24, 1962, Ser. No. 232,742
13 Claims. (Cl. 73—23)

This invention relates to new and improved detection devices, analyzers utilizing such detection devices, and methods and techniques utilizing the foregoing. In particular, the invention relates to coated responsive materials and analyzers containing such coated materials to analyze certain specific fluid materials, such as gases.

This invention is a continuation-in-part of U.S. Serial No. 110,189 filed May 15, 1961, now Patent No. 3,164,-004, by William H. King, Jr.

The selective detection of gas compositions is of great importance in industry. For example, in gas chromatography it is necessary to determine the composition of the effluent. In addition, many analyzers have wide use, as in determining water in fuel; water and/or $H_2$ in powerformer feed; $CO_2$ in exhaust, flue gas, and carbon analysis; and $SO_2$ and $SO_3$ in sulfur analysis. Other areas of application include analysis of $H_2S$, aromatics, olefins, and paraffins. These uses are of particular interest in the petroleum industry. Some other uses and applications of the instant invention will appear subsequently in the specification. Many other uses and applications will be apparent to one skilled in the art.

In the copending parent case it was found that piezoelectric and magnetostrictive materials when coated with a substrate selectively sensitive to changes in their environment can serve as detection devices for use in analyzers. For example, piezoelectric materials will exhibit different vibrational frequencies and amplitudes depending on the amount of material and particular material which interacts with a substrate. Thus the detection device in an analyzer can measure composition by sensing its own weight change.

In brief, one embodiment of this invention relates to analyzers which use two detection devices, at least one of such detection devices containing a substrate selective to a particular material. The net output of the two detection devices is a measure of the interaction of at least one component to be detected with the substrate. By detection device is meant a responsive material usually having a substrate on it but not necessarily having a substrate. If two detection devices are used in an analyzer then at least one of said detection devices has a substrate, usually both. The substrates are usually different on both detection devices. However, the same substrate can be used by keeping one detection device at a different temperature than the other. If only one detection device is used in an analyzer then it will always have a substrate.

The basic principle of a detection device to be used in an analyzing apparatus is set forth in Serial No. 110,189. While the entire disclosure of said copending case is incorporated by reference, so much of it will be repeated as is necessary to understand the present invention and to conform to the requirements of a continuation-in-part application. Briefly, a detection device measures fluid compositions by determining the amount of material that selectively interacts with a substrate. The substrate is coated on a responsive material. When the responsive material is placed in a suitable oscillating circuit it will vibrate at a particular, natural frequency. The oscillation changes as the weight of material which interacts with the substrate changes. It is the change in oscillation that can be measured and serves as the basic analytical tool. The change in oscillation can be either in frequency or amplitude or other measurable change.

A preferred analyzer of the invention consists of a detector-oscillating-circuit and a reference-oscillating-circuit. The detector-oscillating-circuit has a detection device with a substrate selective to a component to be detected. The reference-oscillating-circuit has a detection device with either no substrate on the responsive material or a substrate not selective to the material to be detected. A mixing circuit matches off the signals from the detector-oscillating-circuit and the reference-oscillating-circuit and transmits a net difference signal to a display device. Mixing circuits are well known in the art and need not be further described. This signal is usually an audio signal but can be a radio signal. The display device can be a visual means of seeing a digital or analog signal. Preferably the signal received from the mixing circuit is a frequency in the audio range. For research work and other high precision type operations digital display is preferred. Analog display can be used such as an indicating meter, a recorder, and the like.

The invention can be fully understood by referring to the description herein and the claims taken in conjunction with the accompanying drawings wherein:

FIGURE 13 shows a pair of twin concentration curves for aromatic detection using a conventional thermal conductivity detector and the analyzer of the invention.

Figure 1:
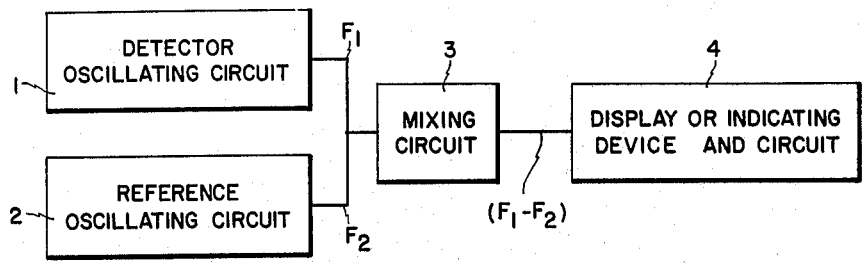
FIGURE 1 is a block schematic of one embodiment of the apparatus and technique of the invention.

Referring now to FIGURE 1, a block schematic is presented representing a typical analyzer of the invention. There it is seen that the frequency F–1 from detector-oscillating-circuit 1 and frequency F–2 from reference-oscillating-circuit 2 are conveyed into mixing circuit 3 which is similar to an ordinary radio receiver circuit where the smaller signal is subtracted from the larger. From the mixing circuit a signal equal to F–1 minus F–2 is passed into display device 4. This means of subtracting a smaller frequency from a larger one to result in a single net frequency which is measured is referred to as the beat frequency method or means of measurement.

Figure 2:
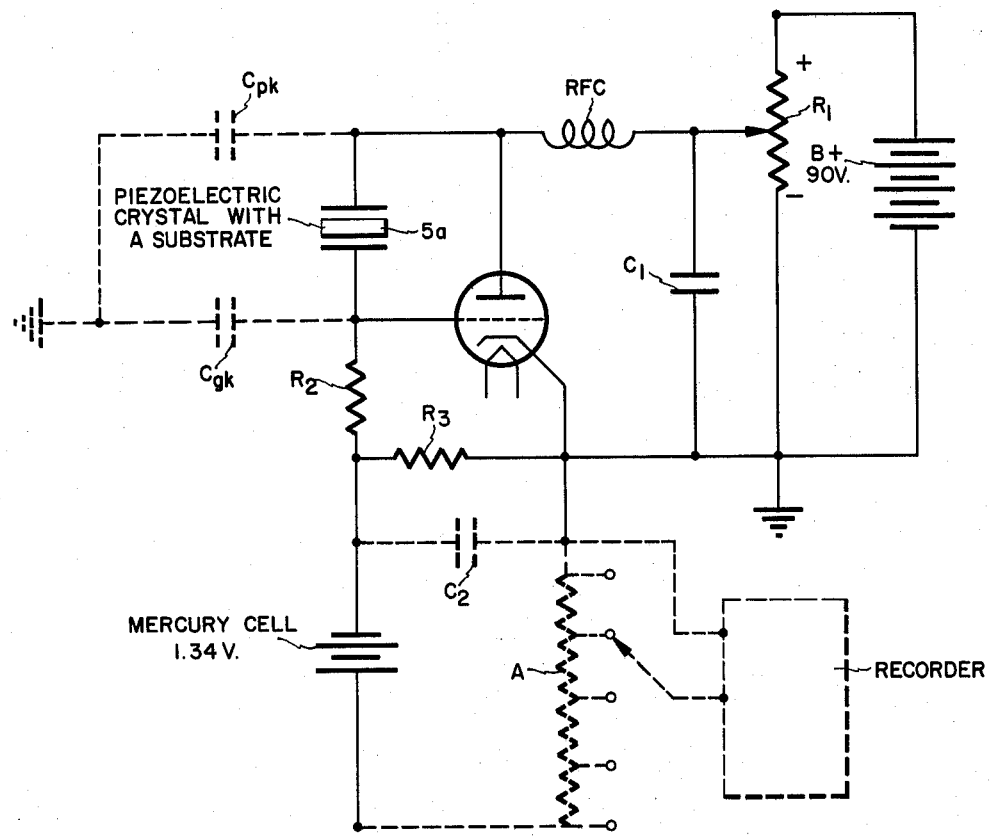
FIGURE 2 is a typical oscillator circuit which can be used in the analyzers of the invention.

Turning now to FIGURE 2, there is depicted a specific embodiment of a typical oscillator circuit which can be used for the detector-oscillating-circuit. The identical circuit can be used for the reference-oscillating-circuit except for the type of substrate on the detection device. Also for some purposes the reference detection device can have no substrate.

Specifically, this circuit is a Pierce oscillator which is essentially a Colpitts Hartley oscillator having inductance capacitance tank circuit replaced by the quartz crystal.

B+ voltage is applied across the cathode and the plate of the triode. The value may be adjusted by varying the resistance of potentiometer R–1 so as to obtain approximately 1.34 volts across resistance R–3. This voltage opposes the standard 1.34 volts of the mercury cell resulting in zero potential output. Thus, the output is a signal proportional to the changes in the grid bias. This grid bias directly reflects changes in amplitude of vibration of piezo electric crystal, i.e. detection device 5a. The radio frequency choke (RFC) and the capacity C–1 prevent the radio frequency current from entering the direct current power supply. Capacity C–2 keeps the radio frequency signal out of the output. Detection device 5a is connected directly between the grid and the plate, and the amount of feedback is dependent on the interelectrode and other capacitances that may exist from the grid to cathode and the plate to cathode circuits, and the properties of the responsive material of the detection device.

This feedback and the setting of R–1 determine the amplitude of vibration of the piezoelectric crystal used as the responsive material of detection device 5a. The plate to cathode and grid to cathode capacitances are shown in the circuit by means of dotted lines. Resistors R–2 and R–3 serve as the grid leak bias. If this particular oscillator circuit with a detection device is to be used alone as an analyzer the 10 millivolt recorder is used, which is shown in dotted lines.

In the event that it is desirable to measure changes in the frequency of vibration, other appropriate circuits well known in the art may be employed. In addition, it should be emphasized that the particular type of oscillator circuit within which the crystal is placed is not critical. There are many such oscillators which may be used, for example, the Hartley oscillator and its many modifications, the tuned grid tuned plate oscillator, the Dynatron oscillator, the transitron oscillator, and many forms of other feedback oscillators. If amplitude measurement is desired it can be accomplished conveniently by measuring the rectified grid current in the oscillator circuit. There are many other ways to measure amplitude well known to those skilled in the art. If transistor oscillators are used, the amplitude of vibration is indicated by collector current or base bias voltage. The choice of the oscillator depends on the particular stability requirements and naturally affects the sensitivity of the detection apparatus. The necessary modifications of oscillator circuits required to secure high efficiency and stability are well within the knowledge of those skilled in the art.

It is apparent that the technique and concept described above for measuring the change in signal of a certain substrate-coated, responsive material as contrasted to a reference responsive material, can be applied to many, many different types of fluid, e.g. gaseous mixtures for detection.

If, for example, a substrate on one detection device is selected to aromatics and paraffins, but relatively more sensitive to aromatics and a substrate on the other detection device is selected to both aromatics and paraffins to about an equal degree, then a gas containing aromatics in the presence of paraffins can be easily analyzed for aromatics. Also by properly proportioning the outputs of the two oscillating circuits paraffins can be analyzed in the presence of aromatics. Since one responsive material with a substrate, e.g. detection device, will be equally responsive to paraffins and aromatics and the other will be relatively more responsive to aromatics than paraffins, the paraffin responses can be made equal to each other and thus their response can be canceled out. In such a case the signal obtained will be due solely to aromatics. Thus, aromatics can be detected in the presence of paraffinic materials since there will be a net output signal only when aromatics are present. This is an extremely important concept since there can be situations when a substrate is not easily available or even known that is selective only to a particular desired component to be analyzed. Naturally, this principle can be widely applied to a myriad of materials beyond the illustrative paraffin-aromatic example herein as will be apparent to one skilled in the art having the benefit of this disclosure. It follows that by using this technique many otherwise difficult analyses can be carried out. For purposes of simplicity this extremely significant concept is called "differential analysis." The following discussion will further illustrate how "differential analysis" works.

Thus for "differential analysis" the sensitivity of the detection devices is adjusted so that the output of the two oscillator circuits for a given material, say, paraffins is the same. This adjustment can be done with electrical attenuators or by adjusting the amount of substrate on the detection devices. It will be understood that it is necessary that the two substrates be selective to a differing degree to the material to be detected and to a contaminant.

The effect of this technique is that when an aromatic is analyzed in the presence of paraffins, the net signal obtained is due to aromatics. This is because when the output from each of the oscillator circuits due to paraffins is equal and the two outputs are subtracted from each other, the response due to paraffins cancels out and only a signal corresponding to the aromatics is received. In a similar manner paraffins can be detected in the presence of aromatics by adjusting the two oscillator circuits so that the output of each due to aromatics is equal.

The following mathematical treatment will further illustrate the "differential analyzer" concept.

Let $R$ = Total response of one oscillator circuit
$R'$ = Total response of another oscillator circuit
$K_a$ = Response coefficient for aromatics
$K_b$ = Response coefficient for paraffins
$C_a$ = Concentration of aromatics for one oscillator circuit
$C_a'$ = Concentration of aromatics for another oscillator circuit
$C_b$ = Concentration of paraffin for one oscillator circuit
$C_b'$ = Concentration of paraffin for another oscillator circuit
$X$ = The selectivity factor of one substrate
$Y$ = The selectivity factor of another substrate Then (1) $$R = K_a C_a + K_b C_b$$

For a nonselective substrate $K_a = K_b = K$ (2) $$R = K C_a + K C_b$$

For a particular selective substrate $K_a = X K_b$ (3) $$R' = K_a' C_a + K_b' C_b$$

(4) $$R' = X K_b' C_a + K_b' C_b$$

Now by adjusting the amount of substrate on the detection devices or by using atenuators on each oscillating circuit. The response coefficients can be changed to any desired value.

*Case 1.*—Adjust both oscillating circuits so $K = K_b'$. Then subtract the two responses to get a differential output.

$$R = K_b' C_a + K_b' C_b$$

(5) $$R - R' = (K_b' C_a + K_b' C_b) - (X K_b' C_a + K_b' C_b)$$

(6) $$R - R' = K_b'(1 - X) C_a = K C_a (1 - X)$$

$C_a$ = Concentration of aromatics and therefore a differential analyzer would respond only to a species which is an aromatic in this specific example.

*Case 2.*—Adjust $K = K_a' = K_b$. Multiplying Equation 2 by X, then (7) $$XR - R' = X(K C_a + K C_b) - (X K C_a + K C_b)$$

(8) $$XR - R' = X K C_b - K C_b = K(X - 1) C_b$$

Thus, the differential analyzer responds only to species b which in this case is paraffins.

For the more general case where it is desired to have an equation expressing both the X factor and Y factor in the same equation the following applies:

(9) $\quad R' = XK'C_a + K'C_b$

(10) $\quad R = YKC_a + KC_b$

If $K' = K$ then,

(11) $\quad R' - R = KC_a(X - Y)$

If it is desired to have the same type of equation in terms of $C_b$ then the R' equation should be multiplied by Y and the R equation by X. Then

(12) $\quad YR' - XR = KC_b(Y - X)$

A particular, preferred embodiment of this invention is an apparatus which is admirably suited as a water analyzer. For many years there has been a substantial industrial and laboratory need existing for apparatus to measure very small concentrations of water in various fluid streams. For instance, in powerforming it is very important to have extremely dry hydrogen in the recycle streams. Therefore, it would be quite advantageous to utilize water analyzers to monitor the plant stream and determine if the drying equipment is operating properly. Another example is in polymer plants where it is important to maintain certain water levels so that the catalyst, such as a phosphoric acid catalyst, is maintained in active condition. In plants where there are water driers such as those made up of absorbents, their operation can be improved by having some way of rapidly determining when water breakthrough is taking place or the time it takes for water breakthrough to occur.

This problem has been recognized and there have been many attempts to develop water analyzers. A typical or popular type is the electrolytic hydrometer. This unit operates satisfactorily in extremely clean streams but it is disadvantageous since it is limited to the range of 1 to 1000 parts per million of water, it has a slow response at low concentration ranges, and it cannot be used to measure low level of water in hydrogen streams. Moreover, this type of unit requires a large amount of maintenance and personalized attention.

A preferred embodiment of the present invention is the water analyzer which uses a piezoelectric crystal as a responsive material for both the oscillator circuits. The detection device of the detection circuit has a sulfonated polystyrene as the active substrate. The substrate in the reference-oscillator-circuit is a polystyrene which is not sulfonated. Other good substrate materials when water is to be detected include ion exchange resins, molecular sieves, silica gel, alumina, and many other hydrophilic substances. The preferred materials to be used on the responsive material for the detection device of the detector circuit are sulfonated solid and liquid polymers of vinyl aromatics including vinyl benzenes having 1 to 6 vinyl groups per benzene molecule, preferably divinyl benzenes and especially preferred styrene.

Methods of applying the substrate, e.g. a polystyrene to a responsive material, e.g. a quartz piezoelectric crystal, are as follows.

A water soluble, noncrosslinked, high molecular weight, sulfonated, polystyrene polymer was prepared by a published technique. Details of the preparation of this polymer can be found in preprints of the Division of Polymer Chemistry, A.C.S. Volume 1 #2, pages 140–146, 1961 by Albin F. Turbak. A thin film of this polymer was applied to each detector oscillator crystal from a water solution using a small camel's hair brush. The films had a thickness of 0.01 to 5 microns and an average weight of about 1 to 500 micrograms per square centimeter. After drying, the frequency change or other change in oscillation on applying the substrate is measured to give an indication of how much substrate was applied.

After coating the crystal, it was sealed in a metal holder and flushed with dry methyl alcohol to remove oil film and fingermarks, etc. The substrate of this detection device can be destroyed with liquid water in excess amounts. Therefore some care must be taken but this is not an important problem. Another substrate material which is also sulfonated polystyrene was prepared by manufacturing it on the crystal surface. A thin film of polystyrene was applied to the crystal surface with a paint brush using a benzene solution of the polystyrene. After this film dried the crystal was alternately exposed to dilute dry $SO_3$ gas and then room air. The $SO_3$ gas was obtained by bubbling air through fuming sulfuric acid.

By this method a very thin film of fuming sulfuric acid formed on the surface of the polystyrene converting the polymer into the sulfonate. The amount of $SO_3$ gas to be used is empirically determined depending on film thickness and quantity. The preferred detectors were made with three exposures of 5 to 10 minutes of the $SO_3$ gas using room air exposures of 5 to 10 minutes in between the $SO_3$ treatments. After sulfonation, the crystal was washed in water to remove excess acid and flushed with alcohol to remove all foreign material. Some monomers, of course, can be polymerized right on the responsive material.

Detection devices prepared by manufacturing the desired substrate on the responsive material are not destroyed by flushing with liquid alcohol or water.

There is a wide variety of other materials, particularly ion exchange resins, available which can be used as substrate materials. It is difficult to coat crystals with these resins because they are insoluble in most known solvents. Some successful detection devices were prepared by using glue. An ion exchange resin was first ground to a very fine powder and applied to a crystal which was previously coated with a thin film of polystyrene. The crystal was then held close to a hot soldering iron in order to melt the polystyrene and cause the powder to stick to it. Normally, enough powder will stick to the polystyrene when it cools to make a satisfactory detector.

The preferred coating technique employed on reference detection device crystals especially for water analysis is as follows. After a detection device crystal for the detector circuit has been made and dried, its absolute frequency is measured. The corresponding reference detection device for the reference oscillator circuit is then prepared by coating pure polystyrene on a new crystal until the frequency of the reference detection device matches the detector detection device within a few hundred cycles. In all crystal coating methods it is important to make a reasonably uniform film. Nonuniform films result in crystals which are difficult to maintain in a stable oscillation condition. Frequency shifts up to a hundred kilocycles may be obtained using polystyrene, and the ability of the crystal will not be impaired providing a uniform film is applied. The uniformity of polystyrene films can often be improved by heating the crystal in a horizontal position at 600° F. for about one minute.

Figure 3:
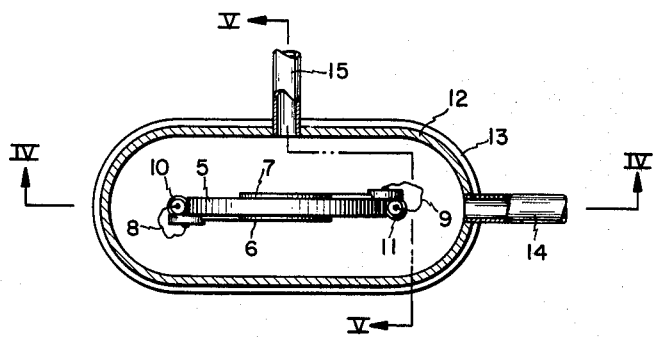
FIGURES 3, 4 and 5 are views of a piezoelectric crystal and its housing which can be used in the detection devices and analyzers of the invention.
Figure 4:
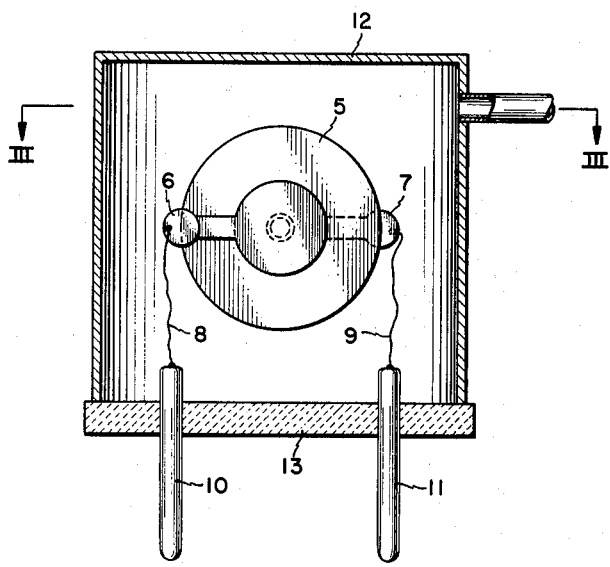
Figure 5:
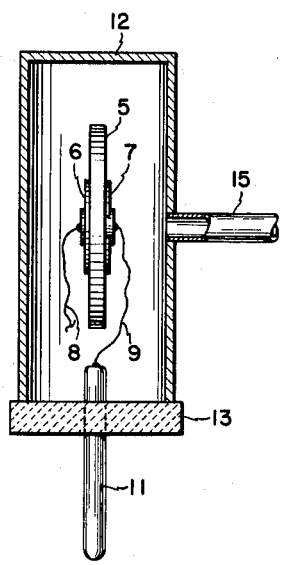

Turning now to FIGURES 3, 4 and 5, cross-sectional views of a particular housing and crystal which may be used in the instant invention are illustrated. The crystal which is about 1.2 centimeter in diameter and about 0.016 centimeter thick and is quartz is represented on the drawings by the numeral 5. The electrodes contact opposite faces of the crystal and are represented by numerals 6 and 7. Wires 8 and 9 connect the electrodes to pins 10 and 11, respectively. These pins serve to connect the crystal to the particular oscillator circuit. The crystal and electrodes are sealed within housing 12. This housing has a volume of about 2.5 ml. and is sealed at the base by ceramic insulator 13. The outside dimensions of the housing are 18.5 mm. in width, 8 mm. in depth, and 17.5 mm. in height. The pins 10 and 11 have an outside diameter of 0.05 inch and are spaced 0.486 inch apart. A gas inlet 14 is provided and an outlet 15 for circulating the particular gas which is to be analyzed. The particular material which the housing 12 is composed of can be any of numerous materials as long as it is unreactive with the gaseous composition to be passed therethrough and is capable of making the enclosure airtight as to the outside atmosphere.

Figure 6:
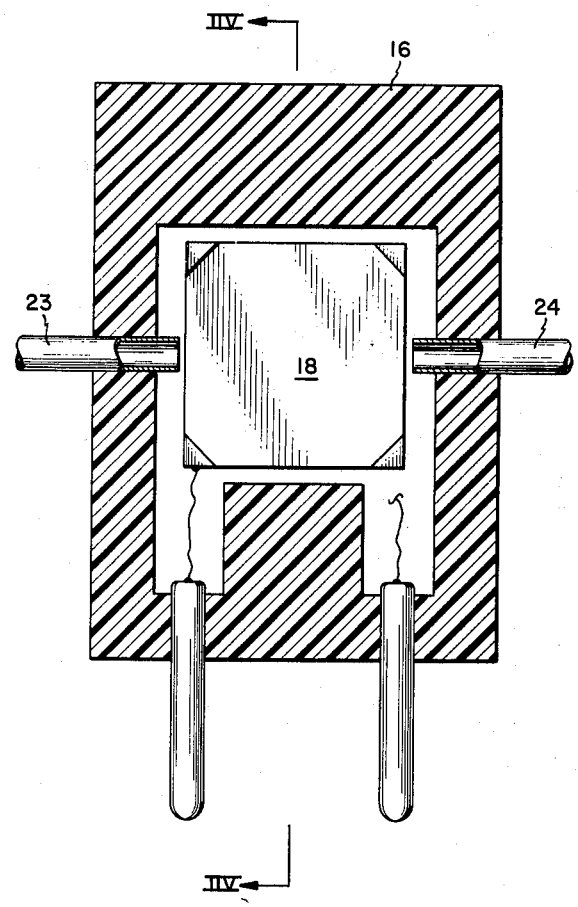
FIGURES 6 and 7 are views of a pressure mounted, corner clamped, piezoelectric crystal which can be used in the detection devices and analyzers of the invention.
Figure 7:
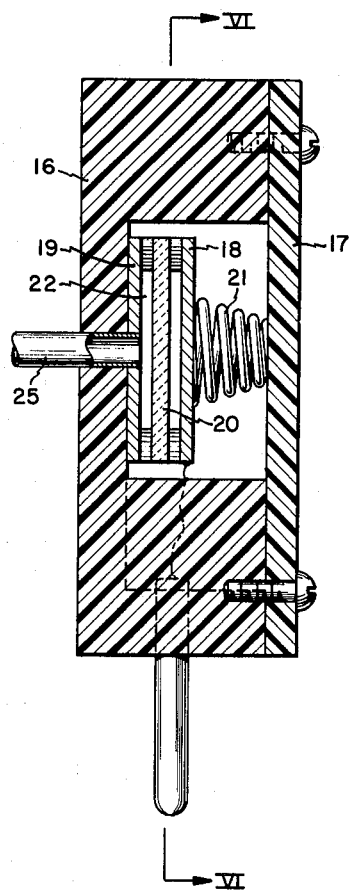

FIGURES 6 and 7 illustrate a front and side section of a pressure mounted, corner clamped crystal used for low volume detectors. These detectors are particularly useful in kinetic studies as will be brought out subsequently. The unit is essentially composed of a Bakelite holder 16 and a front cover 17 fastened thereto. Within the area bounded by the holder 16 and the cover 17 are located a front and rear electrode 18 and 19, respectively, and a quartz crystal 20. The two electrodes sandwich the crystal and are held in place by a spring 21. The volume of the detector is that area between the electrode 19 and the crystal, and is indicated by the numeral 22. The external dimensions of the Bakelite holder are width, 20.7 mm.; depth, 11 mm.; and height, 28.8 mm. Rear and side gas tubes are indicated by the numerals 23, 24 and 25.

While the above-described crystals and mounting units have been found satisfactory for use in the instant invention, it should be clear that many other types available and known to the art would be equally satisfactory. Briefly, the essential factors are that the responsive material be provided with electrodes and that an area be defined wherein the gas to be analyzed may be confined without danger of dilution to the outside atmosphere.

The particular "responsive material" which may be employed in accordance with this invention is defined as any material which exhibits piezoelectric or magnetostrictive properties.

The material exhibits piezoelectric properties if, when subject to mechanical pressure, it develops an electrical potential and vice versa, when subject to an electrical potential, it mechanically deforms. Several such materials are known, for example, crystals such as quartz, tourmaline, and Rochelle salts and other materials such as barium titanate. Quartz is the particular crystal most often employed in electrical applications, but the instant invention is not to be limited thereto.

A magnetostrictive substance is a material which will produce a magnetic field upon mechanical deformation and vice versa will mechanically deform in the presence of a magnetic field. Examples of materials which exhibit such properties are nickel and nickel alloys.

The particular frequency at which the material oscillates is dependent on several factors, for example, the thickness of the material and, in the case of crystals, the particular axis which it was cut along; the electrode structure; the characteristics of the associated circuit; temperature; etc. If it is desirable to have a circuit of extremely high stability, it is often advantageous to maintain the responsive material and its associate parts in a thermostatically controlled environment such as an oven. In the application of the instant invention, the temperature of the gaseous composition to be analyzed must be considered so as not to adversely affect the temperature of the crystal.

"Substrate" as used in the instant invention shall be taken to mean any thin film or coating deposited in predetermined quantity on the responsive material. The substrate may be either liquid or solid.

The particular substrate employed depends on the function which it must serve. For most practical applications, it should have a reasonably long residence time on the surface of the responsive material. Hence, a low vapor pressure material is desirable but not absolutely necessary since the substrate may easily be replaced.

Of course, the substrate must have the ability to "interact" with the particular fluid, e.g. gaseous composition, to be detected. The term "interact" as used herein shall be defined to include both chemical and physical phenomena. For example, the fluid, e.g. gas, to be analyzed may react chemically with the substrate or be adsorbed or absorbed therein.

Where the detection is selective for a particular component of the fluid, e.g. gaseous composition, it is the interaction of the particular constituents with the substrate that affects amplitude and frequency of the vibrating responsive material. Examples of the substrates which would be selected for particular operations are as follows:

| Compounds to be detected | Substrate |
| --- | --- |
| Hydrocarbons, without regard to compound type. | Squalane (hydrogenated squalene). Silicon oil. Apiezon grease. |
| Aromatics selectively | B-B'-oxydipropionitrile. Sulfolane. Polyethylene glycol-400. |
| Oxygenated compounds | Dinonyl phthalate. Tide (alkyl sulfonate). Aldol-40. |
| Unsaturated compounds | Glycerol plus AgNO$_3$. Sulfolane. |
| H$_2$O | Sulfonated polystyrene. Silica gel. Molecular sieves. Alumina, etc. |
| H$_2$S | Lead acetate. Silver metal. Copper metal. Anthraquinone-disulphonic acid. |
| Alcohol | Cellulose acetate and similar polymeric materials. |

The amount of substrate employed is a significant variable in the invention. As will be shown later, its volume, thickness, weight, and location on the responsive material are of significance in determining the response of the detector.

The amount of liquid substrate used varies according to the particular liquid used, but for a liquid like squalane the amount used is preferably 1 to 100, e.g. 1 to 50 micrograms per square centimeter. For solid substrates 1 to 600, preferably 1 to 300 and most preferably 50 to 250 micrograms per square centimeter can be used. Larger amounts can also be used but difficulty is then often encountered in maintaining the responsive material in a condition of stable oscillation. The more the substrate, the higher the sensitivity, but stability and time constant become problems. Therefore, the amount is chosen experimentally for a best compromise. With squalane substrate, satisfactory performance is obtained with 5 to 50 micrograms per square centimeter. The substrate is coated on the responsive material so as to form a thin film. It is desirable to evenly coat the surface so as to properly activate the material.

The technique incident to the location of the coating and thickness of the coating on the responsive material will vary to an extent depending on whether the coating (substrate) is a liquid or a solid. It is not necessary to completely coat the responsive material. Nor is it necessary to coat both sides of the responsive material although it can be done under some circumstances without any adverse effects. If the substrate is a liquid and it is placed on both sides of the responsive material then over a period of time it will spread, or creep, over the entire surface of some responsive materials. It is important that the coating, i.e. substrate, be of a reasonably uniform thickness.

It is preferred that the coating or substrate be located at the approximate area, that is, the region or vicinity of maximum oscillation of the responsive material. This is a particularly pertinent consideration with solid substrates. Substrates located on portions of the responsive material, which portions oscillate substantially less than maximum, contribute little to over-all detection abilities. Since they tend to creep, liquid substrates will, after a time, usually overlap the point of maximum oscillation and can, if desired, be allowed to cover an entire side. It is possible to prevent creeping of a substrate to areas of a responsive material where an interacting coating or substrate is not desired, by coating these areas with a material that the liquid substrate won't wet. Such a material would be preferably inert to the compound to be analyzed.

The thickness of the substrate can be varied depending on the particular conditions encountered. In general, particularly if the responsive material vibrates in the thickness mode, the total thickness of the substrate will preferably not exceed the thickness of the responsive material, more preferably it will not exceed 35% of the thickness of the responsive material. The important consideration is that the quantity of substrate not be great enough to seriously impair the response of the responsive material.

If the entire responsive material is coated, as with liquid substrate, then a relatively thin film of substrate should be employed, i.e. preferably from about 0.001 to 1% of the thickness of the responsive material. This is important since, if the entire responsive material is covered with substrate, usually liquid, or there is otherwise too much substrate, the responsive material will be hindered in its ability to respond. It is preferred that the entire crystal not be coated. If it is entirely coated, then it will preferably be a liquid coating.

Covering the entire responsive material can be wasteful of substrate since it is only necessary to apply the substrate on at least one region or area of maximum oscillation. Also some substrates are difficult to apply as, for instance, in the case of the sulfonated polystyrene already described. It would be disadvantageous to try to apply the substrate over the entire responsive material if not necessary.

It forms an additional feature of the invention that it is necessary that the substrate be located only at a region or areas on the responsive material of maximum oscillation. Of course, if convenient, some substrate can overlap the area of maximum oscillation but it is important that there be some substrate on the area of maximum oscillation of a responsive material.

The preferred detection device is a responsive material with at least the area of maximum oscillation on one side coated with a responsive material. When only the area in the vicinity of the region of maximum oscillation is to be coated with substrate then the substrate will have a thickness of 0.0001 to 30% preferably 0.001 to 10%, more preferably 0.001 to 2% and especially preferably 0.01 to 0.5% of the total thickness of the responsive material.

Figure 8:
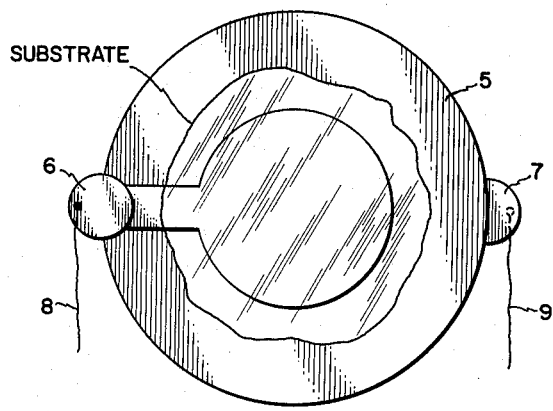
FIGURE 8 is an enlarged portion of the crystal view of FIGURE 3 showing a substrate on said crystal.

The particular areas of maximum oscillation of a responsive material will be apparent to one skilled in the art. For instance, the region or regions of maximum oscillation of the quartz crystal of FIGURES 3, 4 and 5 is where the electrodes 6 and 7 contact the faces of quartz crystal 5. A detection device of the preferred type made from this particular responsive material would have a substrate located over one of the electrodes. Some of the substrate could extend beyond the borders of the electrode. See FIGURE 8 which is an enlarged portion of crystal 5, and electrodes 6 and 7 showing a preferable location of a solid polystyrene substrate on crystal 5 and electrode 15. The thickness of the coating is approximately 0.2% of the thickness of crystal 5. The coating is on only one side of crystal 5. The weight of the substrate is approximately 50 micrograms per square centimeter.

Figure 9:
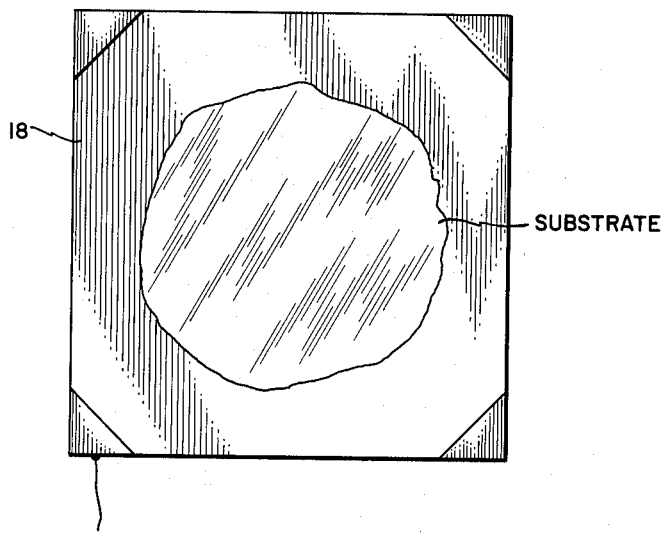
FIGURE 9 is an enlarged portion of the crystal view of FIGURE 6.

In another example the maximum oscillation of the corner clamped crystal 18 of FIGURES 6 and 7 would take place in the vicinity of the center of crystal 18. See FIGURE 9 which is a blowup of crystal 22 of FIGURE 6 showing a solid polystyrene substrate coated on said crystal. The thickness of the substrate is approximately 1% of the thickness of crystal 18. The coating is on one side of crystal 18. The weight of this substrate is approximately 200 micrograms per square centimeter.

It will be understood that interaction with the substrate includes and can be a chemical type reaction. In such a case the electrode can be selected so as to serve as both electrode and substrate. For instance, the electrodes can be gold, silver, platinum, steel, etc. Or the electrodes can be reacted with another substance to form the desired substrate. Moreover, the particular substrate to be interacted with the desired material to be detected can be coated over either the electrode of a responsive material or on the responsive material per se.

If the interaction of the substrate with a particular fluid material is reversible or physical, i.e., adsorption or absorption, the material to be detected should preferably come to equilibrium with the substrate in order to obtain the most accurate measurements. This means that the substance to be analyzed will enter into the substrate which is selective to it. Sometimes this substance will even come into contact with the responsive material or the responsive material and electrode. Thin coatings and low weight coatings generally indicate a quick equilibrium and a rapid response time.

In general, except as with the sulfonated polystyrene and solids not easily soluble in ordinary solvents, the method of coating the responsive materials is not critical provided the responsive material remains undamaged after coating. It must oscillate with the coating applied. With liquid, a typical procedure is as follows. Using a microsyringe, a few microliters of a solution of substrate in a volatile solvent are dropped on the surface of the responsive material. When the solvent evaporates, the substrate spreads out slowly and covers the surface uniformly. With squalane, this occurs in two or three days depending on the temperature. Sixteen hours in an oven at 150° F. will also result in an even coating for squalane. Silicone oil (DC-200) is very viscous, but when heated 16 hours at 250° F. uniform coatings are obtained. The time for creeping of liquid substrates is a function of the substrate and the practical waiting time. Squalane is saturated squalene.

Solid substrates of many forms can be applied with cement. Some very fine powders or crystals may be deposited from solutions or suspensions. If the solid is a metal oxide, it is convenient to make the plated electrodes from the desired metal and then convert the surface metal to the oxide form. In addition, many other techniques could be devised by one skilled in the art.

The response of a detection device is mainly determined by the weight of the substrate, the specific retention volume of the substrate and the total volume of the detection device. The following formula approximately described the detector response and time constant when the amplitude mode of operation is used.

(1) $$R = \frac{KWVg}{V + WVg}$$

(2) $$T.C. = \frac{V + WVg}{F}$$

$R$=Response in percent change in grid current per mole percent solute in carrier gas (percent $\Delta$ I per mole percent)
$T.C.$=Time constant in seconds
$K$=Proportionality factor (usually about 1000)
$W$=Weight of substrate in grams
$Vg$=Specific retention volume in ml./gm.
$V$=Volume of detector in ml.
$F$=Flow rate of carrier gas in ml./sec.

Figure 10:
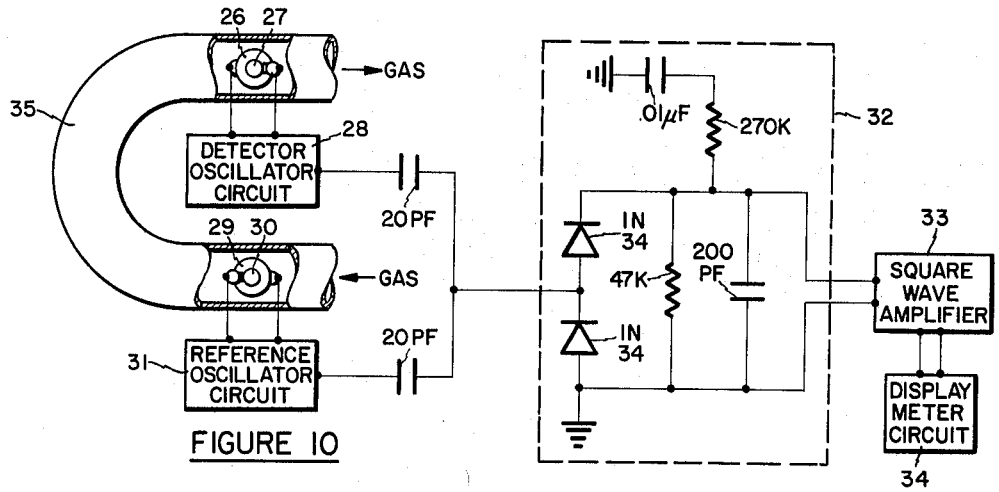
FIGURE 10 is a schematic of a preferred embodiment of the invention, i.e. the water analyzer.

The invention is further illustrated by reference to a preferred embodiment in FIGURE 10. In this preferred embodiment a detection device 26 having a sulfonated polystyrene substrate 27 on a piezoelectric crystal is shown in detector-oscillating-circuit 28. A second detection device 29 having only a polystyrene substrate 30 is shown in reference-oscillator-circuit 31. The output from detector-oscillator-circuit 28 and reference-oscillator-circuit 31 flows through two 20 picofarad condensers to mixing circuit 32 which is shown in detail with various circuit elements within the portion outlined by dotted lines. The output from mixing circuit 32 goes into square wave amplifier 33 and from there into display meter circuit 34. In this particular embodiment the readings are made directly on a meter having a dial face and pointer. As pointed out above, it can also be on a recorder or other indicating means. The circuit elements can either be conventional electronic tubes or, if very small hand-carried equipment is desired, tubes can be replaced by transistors. The invention is further illustrated by the following examples.

EXAMPLE 1

A detection device of the invention with the sulfonated polystyrene substrate as described above was tested with respect to its quantitative response to gases that might be encountered in ordinary commercial use. The detection device was used alone in order to magnify any selection problem encountered.

The test was carried out as follows. An analyzer similar to the one described in FIGURE 2 with the recorder was used in combination with a barium oxide drier. The drier was connected to the detection device and many different discrete gases were passed through this particular analyzer system. The particular analyzer had a minimum detectable limit of 0.1 p.p.m. water.

The results are summarized in Table I following.

Table I

SELECTIVITY OF ANALYZER

| Dry Gas | Indicated $H_2O$ (p.p.m.) |
|---|---|
| 100% Air | Base Point |
| 100% Hydrogen | 0.1 |
| 100% Methane | 0.1 |
| 100% Ethane | 0.1 |
| 100% Ethylene | 0.1 |
| 100% Propane | 0.1 |
| 100% Isobutane | 0.1 |
| 100% n-Butane | 0.1 |
| 200 p.p.m. $H_2S$ in Air | 0.2 |
| 55% $H_2$, 20% $C_1$, 13% $C_2$, 12% $C_3$ | 0.2 |
| 1.5% Ethanol in Air | 1.2 |
| 1.0% $CO_2$ in Air | 2.0 |

As can be seen by the data in the above table, the sulfonated polystyrene of the detection device is completely insensitive to wide changes in gas composition. The detection device is slightly sensitive to ethanol and $CO_2$ but this is not a serious problem. Thus the sulfonated polystyrene is extremely selective to $H_2O$ as compared with other commonly encountered gases.

EXAMPLE 2

Figure 11:
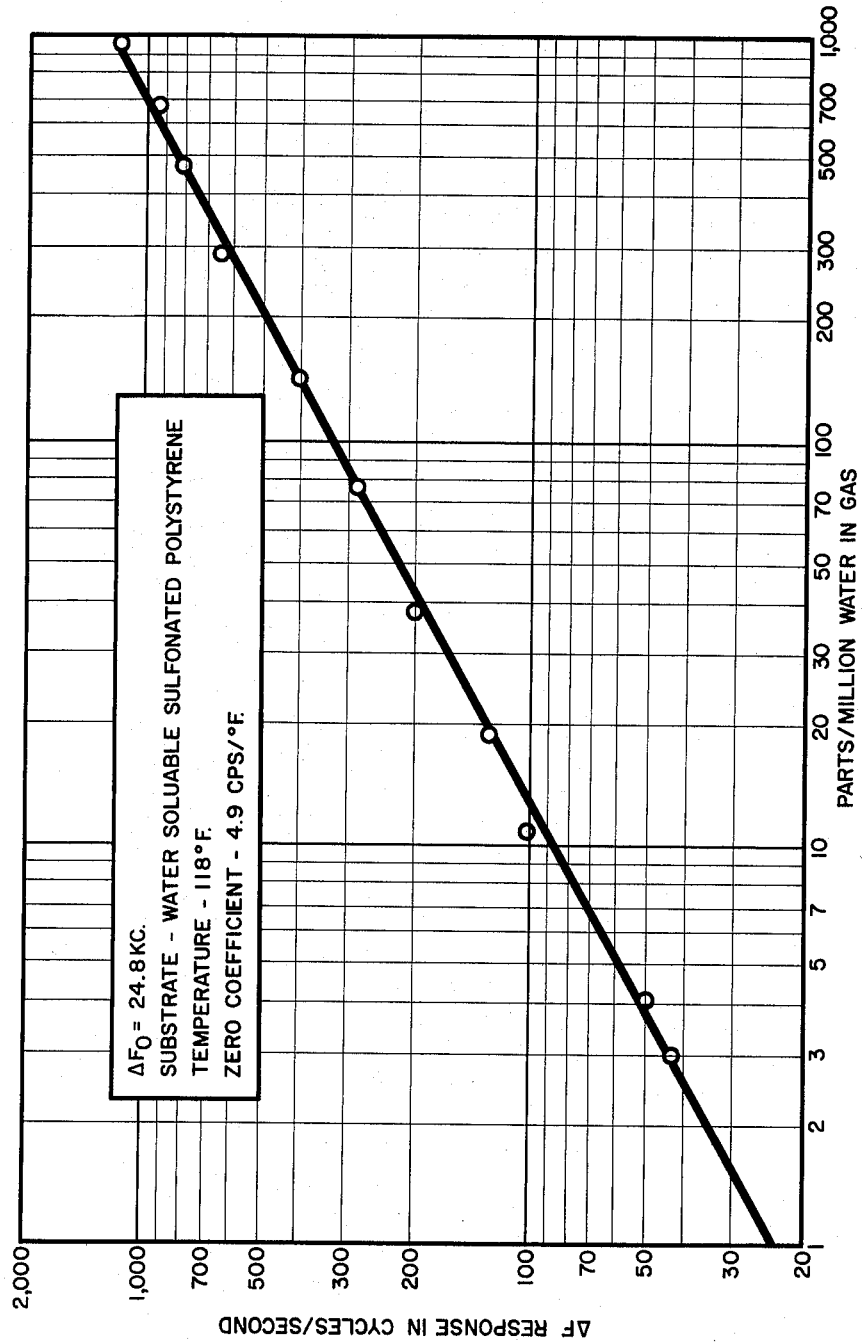
FIGURE 11 is a calibration curve obtained on water-soluble, sulfonated polystyrene.

Using a blending system, flowing gas samples containing from 0.1 to several thousand p.p.m. water were obtained. Using this blending device in connection with various analagous analyzers of the invention, it was found that all of the water analyzers of the invention gave the largest signal at the lowest water levels. A single detector can be used for water concentrations in 0.1 p.p.m. range and cover a very wide dynamic range up to 100% relative humidity which is the order of 30,000 p.p.m. FIGURE 11 is a typical calibration obtained on water soluble, sulfonated polystyrene. The line is exponential having the approximate equation $\Delta F = 23\ C^{.6}$ where $\Delta F$ = the frequency change and $C$ = the water concentration in p.p.m. The particular conditions used are also given on FIGURE 11. The significance of this example is that sensitivity is excellent at low concentrations of $H_2O$ where it is particularly desired.

EXAMPLE 3

A dozen or so detection devices which were made with the water soluble, sulfonated polystyrene showed a high degree of consistency when calibrated. The amount of substrate painted on the crystal was determined by measuring the change in frequency from the clean crystal to the painted crystal. This value is called $\Delta F_0$ and is reported in kilocycles. As would be expected, the crystals painted with more substrate show a higher sensitivity up to the point where oscillation of the responsive material is affected. The average calibration equation is:

$\Delta F = K(\Delta F_0) \times C^{0.6}$
$K$ = Sensitivity coefficient
$C$ = Concentration in p.p.m. water
$\Delta F$ = Frequency change in cycles per second due to $H_2O$
$\Delta F_0$ = Frequency change in kilocycles per second due to applying substrate The value for K in the above equation was calculated for ten different crystals with different values of $\Delta F_0$ and are shown in Table II below.

Table II

| Detection Device | $\Delta F_0$ | K |
|---|---|---|
| A | 1.5 | 1.26 |
| B | 9.7 | 1.20 |
| C | 30 | 1.20 |
| D | 62 | 1.07 |
| E | 2.6 | 1.20 |
| F | 18 | 1.20 |
| G | 9.7 | 1.30 |
| H | 18 | 1.26 |

The data in the above table show that the sensitivity coefficient is reasonably constant over a fairly wide range of coating thicknesses. This suggests it would be possible to coat a crystal with sulfonated polystyrene and by merely measuring the frequency change when the crystal is coated construct a rough calibration curve for the particular detection device. Thus sensitivity can be controlled and approximately predicted.

EXAMPLE 4

The weight of material which can be absorbed by a substrate not only depends on the partial pressure but is also dependent on the temperature; therefore, one would expect the analyzer to have a different calibration at a different temperature. The magnitude of this effect is shown in Table III below:

Table III

| Temperature ° F. | $\Delta F_0 \times K$ Sensitivity Coefficient Cycles/sec./p.p.m. |
|---|---|
| 74 | 35 |
| 91 | 16 |
| 120 | 6.4 |

The data in the above table show that the sensitivity will change about a half a cycle per second per ° F. Therefore, a simple temperature controller to maintain the detection devices of the analyzer within a few degrees should be adequate for measuring even very low concentrations of water. For a fairly rough approximation, ambient room temperature can be assumed to be approximately constant, but for extremely precise measurements, temperature control is important. Temperatures can be controlled in the vicinity of the detection devices by thermistor type devices, ovens and the like.

EXAMPLE 5

One of the preferred water analyzers uses the beat frequency method of measuring the frequency difference between two detection devices. If both detection device crystals are maintained in the same temperature environment and if both crystals have the same temperature coefficient then it would be expected that beat frequencies are independent of temperature. This was shown to be the case in an experiment designed to show temperature compensation only. Two identical crystals were coated with equal amounts of polystyrene. This caused each crystal to have a temperature coefficient of about −5.8 cycles/sec. per ° F. The two crystals were placed in duplicate oscillators in the same oven and the frequency difference was measured as a function of temperature from 80° to 120° F. The data are shown in FIGURE 12.

Figure 12:
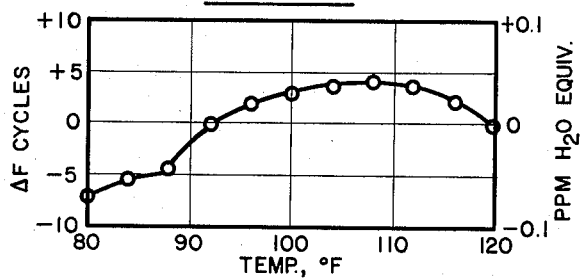
FIGURE 12 shows a graph illustrating the range of temperature compensation.

From FIGURE 12 it can be seen that the maximum frequency difference from the highest to the lowest value is 11 cycles per second. Over the entire range of 80 to 120° F. these small changes would represent less than 0.1 p.p.m. water in a typical analyzer.

When $H_2O$ detection devices are used the situation is not quite as favorable. The temperature coefficient of $H_2O$ analyzers is more difficult to match. A typical analyzer employs one crystal coated with polystyrene and the other with sulfonated polystyrene. Table IV below shows typical data obtained on the temperature coefficients of single detectors which are either clean, coated with polystyrene, or coated with sulfonated polystyrene. Two analyzers are also shown, one where the reference detection device was poorly matched with the detection device, another where a good match was obtained.

*Table IV*

| Unit | $\Delta F_0$ | Temp. Coeff., c.p.s./° F. |
|---|---|---|
| Clean single | 0 | −1.4 |
| Polystyrene single | 5.6 | −.5 |
| Do | 15.0 | −1.75 |
| Do | 64 | −5.75 |
| Analyzer Bad Match | 27 | −24.0 |
| Analyzer Good Match | 25 | −2.5 |

The crystals used in the above Table IV were all made by the same manufacturer in the same batch. These crystals were designated AT-cut and have a zero temperature coefficient within the tolerance normally accepted in communication work. Actually, the temperature coefficient of clean crystals varies ±1 c.p.s./° F. from crystal to crystal.

The above table shows that when a detector is coated the temperature coefficient becomes much worse than that of a clean crystal. This is to be expected because the coating materials have much larger temperature coefficients than quartz. A perfect match in detection devices is not required because temperature control ±1° F. in most cases will result in negligible error in the water content.

EXAMPLE 6

The speed of the analyzer is in the order of minutes. In high ranges above 100 or 200 p.p.m. a response time is less than a minute but, in the region of most interest, that is, in the one p.p.m. level, a response speed for 98% is about four minutes. This is extremely fast compared with the electrolytic hygrometer type of water analyzer.

To show this response speed, the following test was made. A CEC electrolytic hygrometer was connecter to a dry gas supply with 1,000 cc./min. of bypass gas flow which was used to speed up sample line response. An analyzer similar to FIGURE 4 was connected in the bypass line. After dry gas had passed through the CEC hygrometer for several weeks, the water was down to about 2 p.p.m. At this time a gas stream containing 100 p.p.m. of water was switched into the system for a period of about 5 minutes and then the dry gas returned. Data were taken on both the analyzer of the invention and the electrolytic hygrometer on the basis of p.p.m. water indicated vs. time after switching to the dry gas. These data are shown in Table V below:

*Table V*

| Response, Percent of Dry | Analyzer of Invention, min. | Electrolytic |
|---|---|---|
| 66 | 0.3 | 6 min. |
| 90 | 1.5 | 30 min. |
| 95 | 2.4 | 2+ hours. |
| 98 | 4.0 | About 1 week. |

The speed of the analyzer of the invention is most likely determined by the rate of diffusion of water into the substrate. The purge rate of gas through the analyzer does not improve response speed.

This is shown in Table VI below. In order to get a wide range of purge rate, analyzers having different internal volumes and different gas flow rates were employed. Changing the gas purge rate from 3.4 v./v./sec. to 830 v./v./sec. only improved the response time by a factor of two.

*Table VI*

| Flow Rate | | Volume, cc. | Time to Dry, min. |
|---|---|---|---|
| cc./min. | V./V./sec. | | |
| 500 | 3.4 | 2.5 | 5.7 |
| 100 | 11 | 0.3 | 4.0 |
| 1,000 | 55 | 0.3 | 3.3 |
| 2,000 | 111 | 0.3 | 3.0 |
| 100 | 830 | 0.02 | 2.7 |

Flow rate has essentially no effect on the sensitivity of the analyzer providing there are no leaks in the system. If the flow rate should increase the total pressure in the detector because of restrictions in the line, flow sensitivity will be observed because the partial pressure of water is thereby raised in the detector. Thus, it can be seen that the analyzer of the invention has a very high speed of response and is almost independent of gas flow rate.

EXAMPLE 7

In order to demonstrate "differential analysis" the following experiment was carried out. For instance, as pointed out above, "differential analysis" is one of the techniques of the invention wherein, if it is desired to selectively detect A in a mixture of A and B, one detection device, having a substrate relatively more selective to B than A, is used as the reference and on the other detection device a substrate more equally selective to both A and B is used. By proper choice of substrates and electronics the sensitivity to B can be made to cancel out and the analyzer will selectively detect A. It is clear that this technique has great value where no substrate can be found that is selective for A alone.

For the purpose of this example it was desired to detect aromatics in the presence of paraffins. Thus an aromatics differential analyer was constructed by using Dow Corning, D.C–200 silicone oil as the substrate that detects both aromatics and paraffins with about equal sensitivity. Trimetatolyl phosphate was used as the substrate that was relatively more sensitive toward aromatics than paraffins. The response from each oscillator circuit containing the two different detection devices was manipulated and adjusted so that the response to paraffins was the same for each oscillator circuit. The output of a gas chromatograph was passed over a thermal conductivity detector first, and then over the differential analyzer using the particular substrates as described in the example. The results which are shown in FIGURE 13 are those obtained from a simultaneous recording on a two-pen recorder. It should be observed that complete cancelation of paraffins was obtained over a wide molecular weight range.

EXAMPLE 8

In this example quartz crystals similar to the one illustrated in FIGURES 2, 3 and 4 were used. These crystals had a frequency of 9 megacycles and were about 1 cm. in diameter and 0.018 cm. thick. Various quantities of squalane were placed on (1) the center of some crystals, (2) the edge of other crystals, and (3) spread uniformly over one surface of the balance of the crystals. The crystals with various quantities of squalane coated thereon were used to detect 0.2 microliters of normal heptane. The sample analyzer used had a coated crystal, an oscillating circuit, and a recorder. The results are tabulated in Table VII which follows in peak areas in square centimeters. For this crystal the center was an area on the crystal of maximum oscillation. The weight is in micrograms.

*Table VIII*

SIGNAL vs. WEIGHT AND POSITION OF SQUALANE

| Total Weight ($\mu$g.) | Position | Peak Area for 0.2 Microliter-$nC_7$ (cm.²) |
|---|---|---|
| 0 | | 0.76 |
| 5 | Center Spot | 19.1 |
| 10 | ----do---- | 10.0 |
| 15 | ----do---- | 10.0 |
| 20 | ----do---- | 47.5 |
| 20 | Edge Spot | 0 |
| 12.5 | Spread Uniformly | 1.3 |
| 25 | ----do---- | 2.6 |
| 50 | ----do---- | 16.7 |
| 100 | ----do---- | 78.0 |
| 150 | ----do---- | 71.5 |
| 200 | ----do---- | *60.0 |

*Unsteady.

Although not an item in the above table, it was further observed during the course of the experiments that when a drop heavier than 20$\mu$ grams of squalane was placed on the center portion of the crystal, the ability of the crystal to oscillate was noticeably impaired. It will be noted from the data that no peak area was obtained at the edge spot of the crystal. Furthermore, the largest peak area for the uniformly spread squalane appears to be at about 100 micrograms of squalane. Readings could still be obtained at 200 micrograms of squalane but these were less reliable than those readings obtained with less squalane.

The analyzer of the invention is essentially a partial pressure gauge extremely selective to the partial pressure of any fluid component the substrate will interact with. For example, the analyzer used for water determination gives a signal which is dependent only upon the partial pressure of water that is in the analyzer. The fluid, e.g. gas, does not need to be flowing. If the total gas pressure in the detector is known, then the concentration of a particular gas, e.g. water vapor, is determined providing the temperature is the same temperature of calibration.

Therefore, it follows that the analyzer of the invention can be used to measure water partial pressures, water concentrations, and relative humidity in the normal mode of operation. If the temperature remains constant and the concentration of water in a gas remains constant, the device then can measure total gas pressure because the partial pressure of water increases as the total pressure increases. Thus, the water analyzer can also be used as a pressure gauge. In a similar way, temperatures can be determined by keeping the water partial pressure constant and allowing the temperture to change. This works because, generally, a particular substrate's ability to absorb water becomes greater at lower temperatures.

Another unique feature of the analyzer of the invention which makes it suitable for many novel and unusual uses is the fact that it can be fabricated as an extremely small and lightweight unit. For example, a complete water analyzer was built having a total weight of two ounces. This included all parts, i.e. battery, transistors, detection devices, resistors, condensers, etc. This small analyzer puts out a radio signal whose frequency is a function of the concentration of a particular component, e.g. water. Using a radio receiver equipped with a frequency measuring circuit, water content, for example, can be measured many miles from the place where it is being detected.

Another mode of operation involves the use made of an apparatus fabricated by combining a gas dryer, a combustion tube, and a water analyzer. For example, a simple apparatus was constructed to measure alcohol in exhaled breath. A sample of gas, i.e. breath such as that taken in a balloon passes first through a special dryer that removes water vapor but not alcohol. The water-free gas, containing alcohol, then passes through a small tube (preferably quartz) containing an electrically heated platinum wire where the alcohol is combusted to obtain a water product. The gas stream now contains an amount of water proportional to the amount of alcohol which was originally in it before combustion. (For ethyl alcohol three moles of water per one mole of alcohol are obtained.) The reading of the water analyzer is then interpreted in terms of alcohol concentration. Naturally, other materials such as hydrocarbons and other organic materials can be converted to water or other easily detected compounds.

As an alcohol-on-breath analyzer, a simple portable device would be of great value to police in patrol cars, etc. In taverns and restaurants the proprietor could check out his customers just before they leave to make sure the alcohol on their breath does not exceed a certain predetermined amount. It could also be used as an explosion meter, precision hydrogen analyzer, trace oxygen analyzer and the like.

Because the analyzer of the invention is extremely rapid, lightweight, and its output can be measured remotely, it has great use in remote measuring and analyzing applications. The analyzer can be easily made to give off a radio signal which can be received on any suitable equipment such as heterodyne receivers or other mixing means at remote locations. This type of equipment is well known and need not be described in greater detail. The application of this principle to radiosonde balloons can be extremely significant in weather predictions. By knowing the humidity profile of the atmosphere in a vertical direction and at many places, meteorologists would have a powerful new tool to improve weather forecasting. For instance, for this particular use a suitable apparatus would consist of three units, one for pressure, one for temperature, and for humidity, all three having a total weight of only a few ounces.

As an example, the temperature would be measured by a clean "y" cut or other highly temperature-sensitive crystal in an oscillator circuit. This analyzer which would be a little radio would send out a signal whose frequency was determined by the crystal temperature. The pressure sensing unit would be a water analyzer mounted inside the balloon itself. In this case, the gas inside the balloon would be a lighter-than-air gas and would be held at constant humidity.

The balloon would be made out of a nonporous, non-water-permeable material. The balloon is vented to the atmosphere using any convenient means such as a one-way valve, so that the pressure inside equals the atmospheric pressure outside. The humidity sensing unit is a water analyzer crystal exposed directly to the atmosphere. Each of the units would broadcast a signal to receivers on the ground. This type of radio sound equipment would be very cheap because the individual units are their own radio transmitters. This makes for an extremely simple telemetering system. This weather apparatus can be extremely useful since it would be used daily by thousands of weather stations over the entire earth.

Other areas where the remote analysis technique can be used include measurement of humidity inside of tanks by placing an analyzer on a float or mounting it to the roof of the tank. It can also be used as a remote humidity gauge for rockets, to measure humidity of the atmosphere of other planets, in natural gas pipelines, humidity in underground storage, water content in telephone cables and radar installations, etc., and water in liquid oxygen, liquid hydrogen, etc. and other dangerous gases where remote reading is important.

Figure 15:
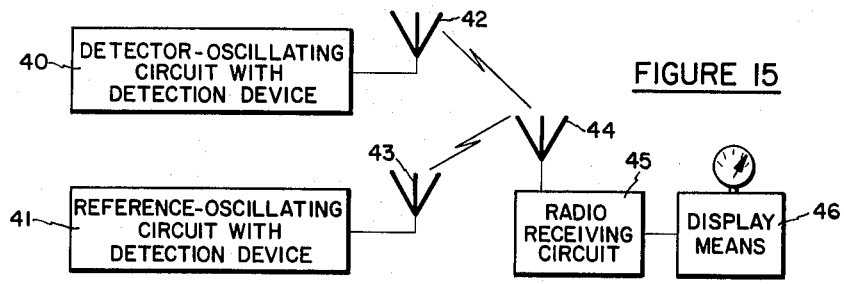
FIGURE 15 is a block schematic of another remote analysis embodiment of the invention.
Figure 14:
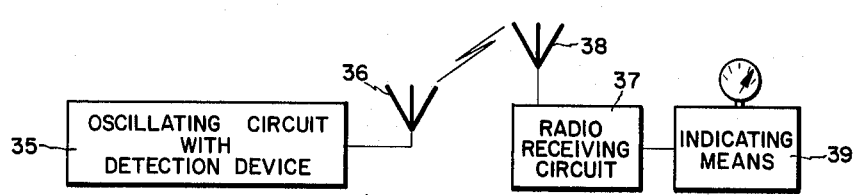
FIGURE 14 is a block schematic of a remote analysis embodiment of the invention.

The remote signal or inaccessible location application of the invention are illustrated in the schematic block diagram of FIGURES 14 and 15.

Referring now to FIGURE 14, oscillating circuit block 35 which is similar to the oscillator circuit of FIGURE 2 except that it has no recorder and transmits radio signals using transmitter antenna 36 through space or air. These signals are received by radio receiver 37 through antenna 38 which conveys the signals to indicating means 39. If desired, especially for long distance transmission, the radio signal from block 35 can be amplified by conventional techniques.

Referring now to FIGURE 15, detector-oscillating-circuit block 40 similar to block 1 of FIGURE 1 and reference-oscillating-circuit 41 transmit radio signals using antennas 42 and 43 respectively through space or air. The radio signals are received through receiving antenna by a radio receiving circuit block 45 which is similar to mixing circuit 3 of FIGURE 1. The radio signals are manipulated to obtain an audio frequency signal which goes to display device hook 46 which is similar to block 4 of FIGURE 1. If desired, for long distance radio transmission amplifiers can be used on blocks 40 and 41.

The water analyzer can also be used to determine water in liquids or liquid A in liquid B. A transport mechanism is needed to move the water from the liquid into the gas phase so the water analyzer can function as a water-in-liquid analyzer. Several methods can be used. For instance:

(1) Bubbling dry gas through liquid and conducting the wet exit gas to the analyzer;

(2) Using a stripping tower to remove water from the liquid. This would insure removing all of the water from the liquid which water would then be analyzed;

(3) Contacting a very small amount of gas with a large flowing stream of liquid. This would permit measuring the amount of water in equilibrium with the liquid;

(4) Flowing a liquid one side of a water-permeable membrane and flowing a gas on the other side. The water would permeate through the membrane and be picked up by the gas. This could be accomplished simply by flowing gas through a water-permeable, plastic tubing immersed in a liquid. Plastics such as polyvinyl chloride, cellophane, and the like would be excellent water-permeable membranes and tubes.

By using the above water-in-liquid technique it is possible to measure low level and high level amounts of water in such things as jet fuel, in the tanks of airplanes, or on tank trucks delivering fuel to the airplane as well as measurement of water in many different solvents such as dry cleaning solvent, water in transformer oil, and many similar type fluids. Also the same principle would apply to measuring liquid A in liquid B.

It is also possible to measure water in solids, for instance measure moisture in soil. This could be accomplished by mounting an analyzer in a porous pipe and driving it into the ground. When the moisture in the ground came to equilibrium with the gas or air in the porous pipe, a reading could be obtained.

Moisture in textiles, paper, plastics, and related things can also be measured. The above type applications would require either placing the analyzer in a closed volume with the wet solid and wait until the system came to equilibrium reading, or some method of contacting the solid with the flowing gas and then flow it into a detector. Probably a significant market for such a device would be in the automatic shutoff or home clothes dryers. The shutoff must be simple and cheap and have a long life. This can be done by one of two methods. One is the use of the present water analyzer. It could be protected from lint in the exhaust of the home dryer by a fitted metal filter.

Another approach involves the use of a crystal mounted on a thermoelectric cooling device with a power requirement of about 1 or 2 watts. The thermoelectric cooler would be set to hold the crystal or detection device at a predetermined temperature corresponding to the dew point at which the dryer was supposed to shut off. Since the gas in the dryer would always be above the dew point until the desired time, a small amount of water would be condensed on the crystal. When the gas reached the dew point of the crystal, the water would immediately evaporate, the crystal would oscillate and signal a relay to shut off the dryer. Clean uncoated crystals could be used for this service but greater sensitivity to the dew point is obtained when a water-sensitive substrate is applied.

Although in the foregoing specification some emphasis has been placed on apparatus and techniques for water analysis and paraffin-aromatic analysis it will be understood that numerous other materials can be analyzed using the apparatus and techniques so described. Moreover, modifications and variations can be employed in the apparatus and techniques described in the invention without departing from the spirit of the invention as hereinafter claimed.

What is claimed is:

1. In an analyzer comprising in combination an electronic circuit oscillator means having a piezoelectric element as a resonant element thereof said piezoelectric element being so constructed and arranged as to be in contact with the fluid to be analyzed, said piezoelectric element having a substrate coated thereon wherein said substrate can interact with at least one component of a material to be analyzed, the improvement which permits said analyzer to have a sensitivity independent of any changes in the temperature and pressure under which the analysis may be conducted comprising a second electronic circuit oscillator means having a piezoelectric element as a resonant element thereof said piezoelectric element being so constructed and arranged as to be in contact with the fluid to be analyzed which piezoelectric element has a substrate coated thereon which substrate does not interact with said material to be analyzed, mixing means operatively connected with said first electronic circuit oscillator means and said second electronic circuit oscillator means whereby a net oscillating frequency is obtained and means for detecting said net oscillating frequency.

2. The improved analyzer of claim 1 wherein said first and said second vibratable piezoelectric elments are quartz crystals.

3. In a fluid detection device wherein the response of an electronic oscillation means is controlled by a piezoelectric element in which a surface of said element is coated with a substrate subjected to contact with the test fluid, the improvement wherein the substrate material comprises a vinyl benzene polymer.

4. In a fluid detection device wherein the response of an electronic oscillation means is controlled by a piezoelectric element in which a surface of said element is coated with a substrate subjected to contact with the test fluid, the improvement wherein the substrate material comprises sulfonated polystyrene.

5. An instrument which comprises in combination a first piezoelectric material which is in contact with a fluid stream to be analyzed, a first electronic oscillator circuit means which is controlled by said first piezoelectric material, a second piezoelectric material which is in contact with said fluid stream, a second electronic oscillator circuit means which is controlled by said second piezoelectric material, a first substrate coated on said piezoelectric material, a second substrate coated on said second piezoelectric material, said first and second substrates being selective to a differing degree to at least one component of said fluid stream to be analyzed, and means to compare the oscillations of said first and second electronic oscillator circuit means whereby the net oscillations due to the presence of said interacting component can be determined.

6. An analyzer according to claim 5 wherein one of said substrates is relatively inert to the substance to be analyzed.

7. An analyzer according to claim 5 wherein one of said substrates is sulfonated polystyrene.

8. An analyzer according to claim 5 wherein said first substrate is sulfonate polystyrene and said second substrate is nonsulfonated polystyrene.

9. A device for differential analysis comprising a first and second oscillator means, each oscillator means comprising first and second piezoelectric elements respectively for controlling said oscillator output; means for passing fluid containing at least components A and B in contact with said piezoelectric elements, said elements having substrates coated thereon, each substrate being selective to each of components A and B but to a different degree; means for adjusting the oscillators to provide an equal response of said oscillators to one of said components A and B; means for differentially comparing the outputs of said oscillators to cancel the equal response of said one component and provide an output proportional to the other of said components; and means for measuring said output.

10. A device according to claim 9 wherein one of said substrates is selective to each of components A and B to about an equal degree and the other of said substrates is selective to each of components A and B to a different degree.

11. Alcohol measuring apparatus for determining the alcohol concentration in a sample fluid wherein alcohol is the only component oxidizable to water comprising in combination:
 (a) Sample fluid inlet means;
 (b) Drying means operatively connected with said sample fluid means to selectively remove water from said sample fluid containing the same and alcohol;
 (c) Alcohol combustion means operatively connected with said drying means to quantitatively oxidize the alcohol in the dried fluid stream to water;
 (d) Analyzer means comprising in combination a first piezoelectric material which is in contact with said oxidized fluid stream; a first electronic oscillator circuit means which is controlled by said first piezoelectric material; a second piezoelectric material which is in contact with said oxidized fluid stream; a second electronic oscillator circuit means which is controlled by said second piezoelectric material; a substrate coated on said first piezoelectric material, said substrate being adapted to interact with water; and means to compare the oscillations of said first and second electronic oscillator circuit means whereby the net oscillations due to the presence of said water can be determined;

whereby the water concentration in said oxidized fluid stream is determined, which concentration of water is proportional to the concentration of alcohol in the original fluid sample.

12. A device to determine the moisture content in dryers comprising in combination a first piezoelectric material which is in contact with the exhaust of a dryer; a first electronic oscillator means which is controlled by said first piezoelectric material; a second piezoelectric material which is in contact with said exhaust of said dryer; a second electronic oscillator circuit means which is controlled by said second piezoelectric material; a substrate coated on said first piezoelectric material, said substrate being adapted to interact with water in said exhaust; and means to compare the oscillation of said first and second electronic oscillator means whereby the net oscillation due to the presence of water can be determined.

13. The device of claim 12 wherein said first and said second piezoelectric materials are quartz and said substrate on said first piezoelectric material is a sulfonated polystyrene.

References Cited by the Examiner

UNITED STATES PATENTS

| | | | |
|---|---|---|---|
| 1,559,461 | 10/1925 | Ruben | 73—26 |
| 1,975,516 | 10/1934 | Nicolson | 73—382 |
| 2,283,919 | 5/1942 | Diamond et al. | 73—170 |
| 2,444,106 | 6/1948 | Miler | 73—170 |
| 2,571,171 | 10/1951 | Van Dyke | 73—29 X |
| 2,845,790 | 8/1958 | Eddy | 73—29 |
| 2,854,354 | 9/1958 | Gottlieb | 117—62.1 |
| 2,897,094 | 7/1959 | Hayes et al. | 117—62.1 |
| 2,935,867 | 5/1960 | Christensen | 73—29 |
| 2,937,524 | 5/1960 | Gregor | 73—335 |
| 2,965,842 | 12/1960 | Jacobson | 73—23 X |
| 3,164,004 | 1/1965 | King | 73—23 |

OTHER REFERENCES

Journal Physics and Chemistry, vol. 63, 3 pages (427–432), 1959.

Books, Gas Chromatography Abstracts, Butterworths, London, Publishers (a) 1959 volume, pages 171–181, (b) 1960 volume, pages 142–149.

RICHARD C. QUEISSER, *Primary Examiner.*

DAVID SCHONBERG, *Examiner.*